Feb. 18, 1941.   A. CALLESON ET AL   2,232,021
TRIMMER
Filed Feb. 3, 1938   4 Sheets-Sheet 1

Inventors
Amos Calleson.
Eilgar A. Calleson.

By Cushman Darby & Cushman
Attorneys

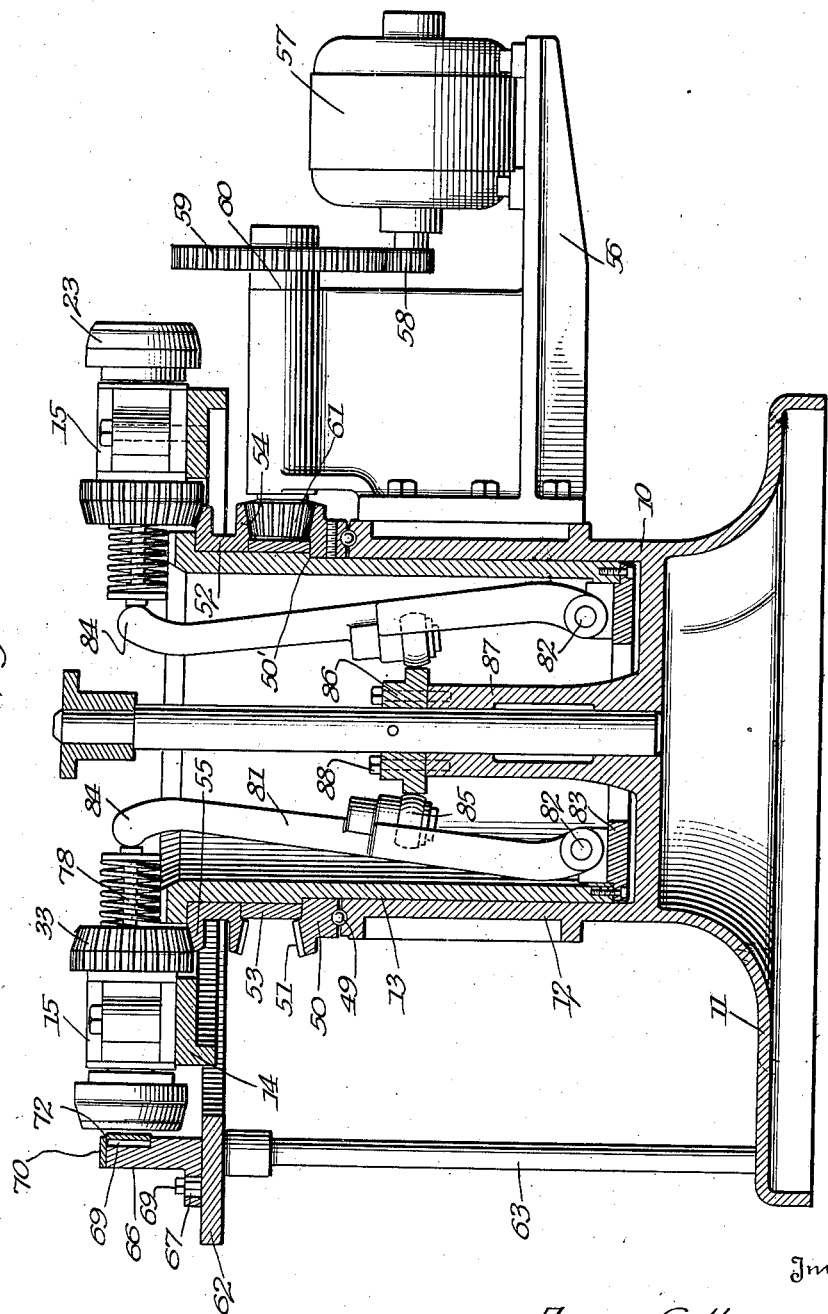

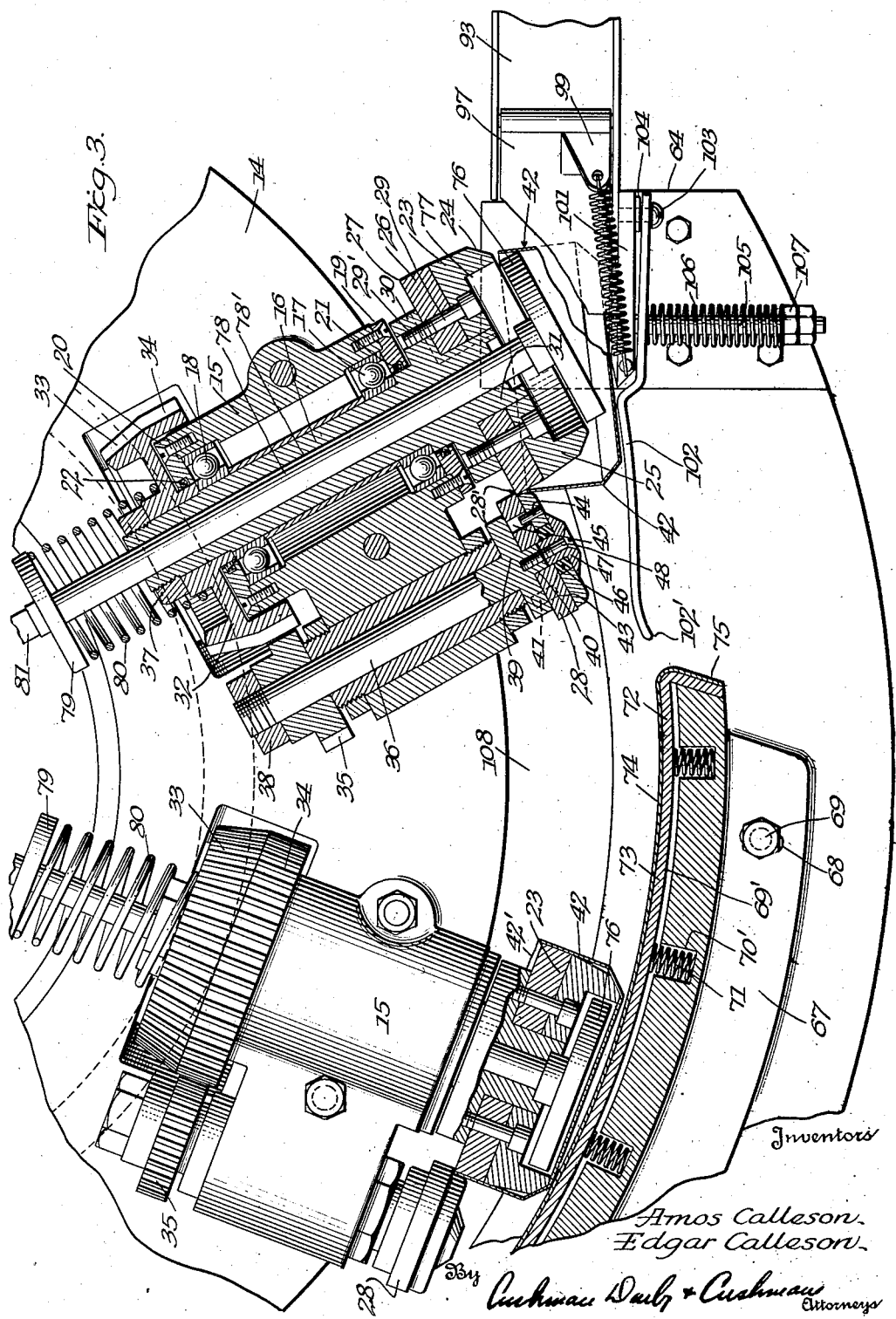

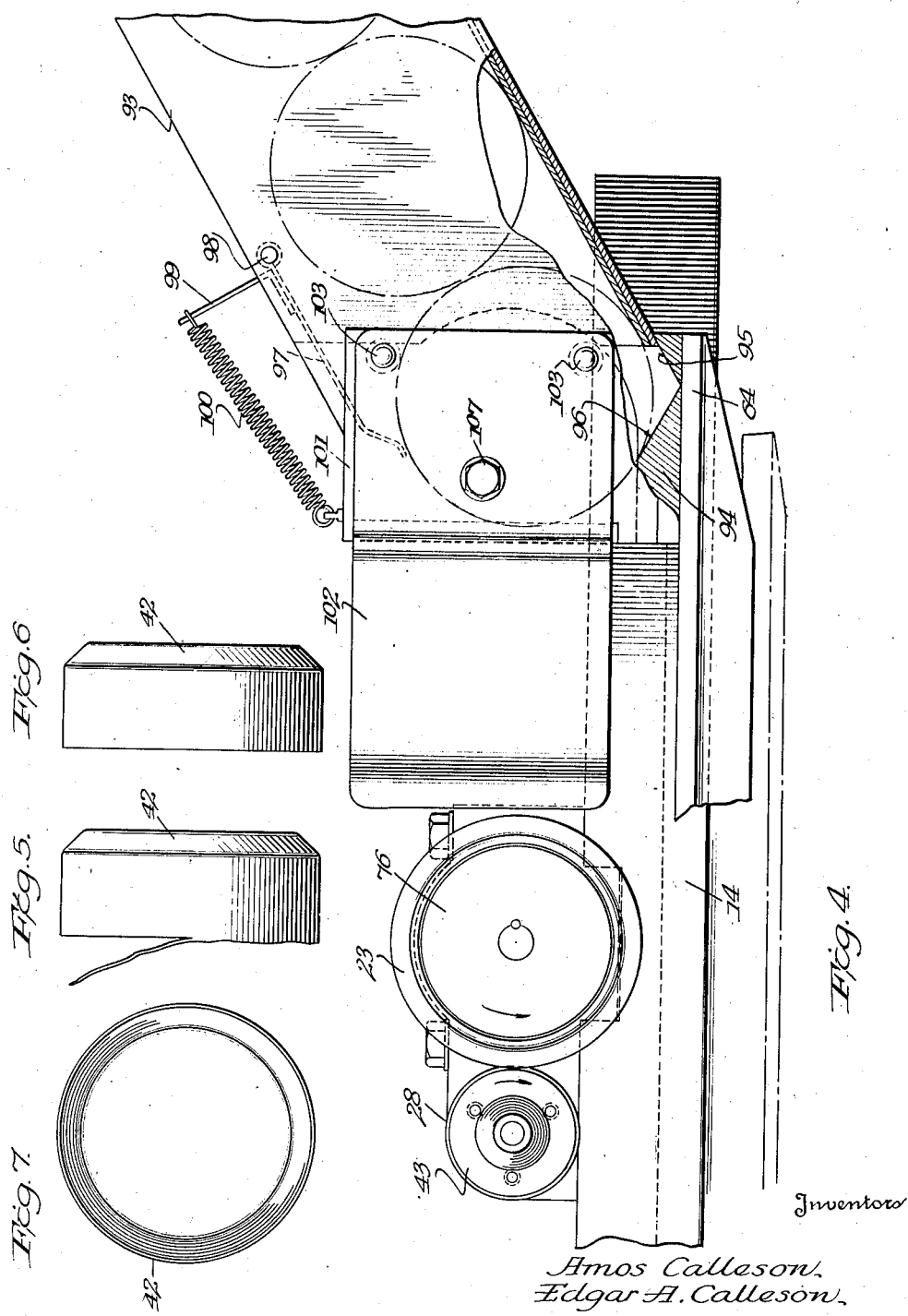

Patented Feb. 18, 1941

2,232,021

UNITED STATES PATENT OFFICE 2,232,021

TRIMMER

Amos Calleson and Edgar A. Calleson, Merrick, N. Y., assignors to Crown Cork & Seal Company, Inc., Baltimore, Md., a corporation of New York Application February 3, 1938, Serial No. 188,586

37 Claims. (Cl. 164—69)

The present invention relates to machines for trimming irregular edges of sheet metal articles, e. g., metal shells formed of sheet metal. The machine is particularly useful for trimming metal shells which have been partially blanked out preliminary to their formation by a drawing operation into seamless metallic containers, such for instance, as beer cans designed to accommodate Crown caps or closures.

An object of the invention is to provide a shell trimming machine which is automatic and continuous in operation and which is capable of turning out trimmed shells in quantity production.

Another object is the provision of a plurality of shell supporting trimmer heads which effect the trimming operation during the travel of the heads between the feeding and discharge stations of the machine.

A further object is to provide shell ejecting means for automatically removing the shells from the trimmer heads after the trimming operation, said means also functioning to position the untrimmed shells squarely on the heads at the shell feeding station, without any cocking action which might otherwise affect the subsequent trimming operation.

Another object is the provision of a shell feeding station wherein the shells are fed down an inclined chute and releasably held in position in the path of the rotating trimmer heads to be automatically engaged thereby and then carried on the heads during the trimming operation.

A further object provides a shell discharge station where the trimmed shells are automatically ejected from the heads and positioned in an inclined discharge chute which carries the shells away from the trimming machine.

The invention also provides means for assuring that the shells are maintained in operative position on the trimmer heads throughout the trimming operation, and means are also provided to insure the rotation of the shells with the heads during the trimming operation.

Another object is the provision of a transmission mechanism for the machine designed to transport the trimmer heads from the feeding station to the discharge station at a constant, predetermined speed, and at the same time rotate the heads at a relatively higher speed to effect the trimming operations during the movement of the heads from station to station. A single prime mover is utilized to drive the transmission mechanism whereby the shells are both transported by and revolved at high speeds on the trimmer heads.

Still another object provides a trimmer head supporting table rotatable about a vertical axis, and a plurality of shell receiving trimmer heads mounted on the table and revoluble at high speed on horizontal axes during rotation of the table.

A further object is to provide a shell engaging spring wall concentrically spaced outwardly from the table and adapted to contact the shells and retain them on the trimmer heads during the trimming operation. The arrangement of the table and spring wall forms an arcuate opening over which the trimmer heads project as they are rotated with the table, and through which the trimmed metal scraps are discharged below the table where they may be disposed of in any suitable manner.

With the foregoing and other objects in view, the invention will now be more fully described, reference being had to the accompanying drawings, in which:

Figure 2 is a vertical section through the machine.

Figure 3 is an enlarged fragmentary top view partly in section and showing a trimmer head positioned to receive a shell from the shell feeding station.

Figure 4 is an enlarged side elevation of the means for feeding the shells to the trimming machine.

Figure 5 is a side view of a partially trimmed shell, and

Figures 6 and 7 are side and end views respectively of a trimmed shell.

GENERAL DESCRIPTION OF MACHINE AND OPERATION

Figure 1:
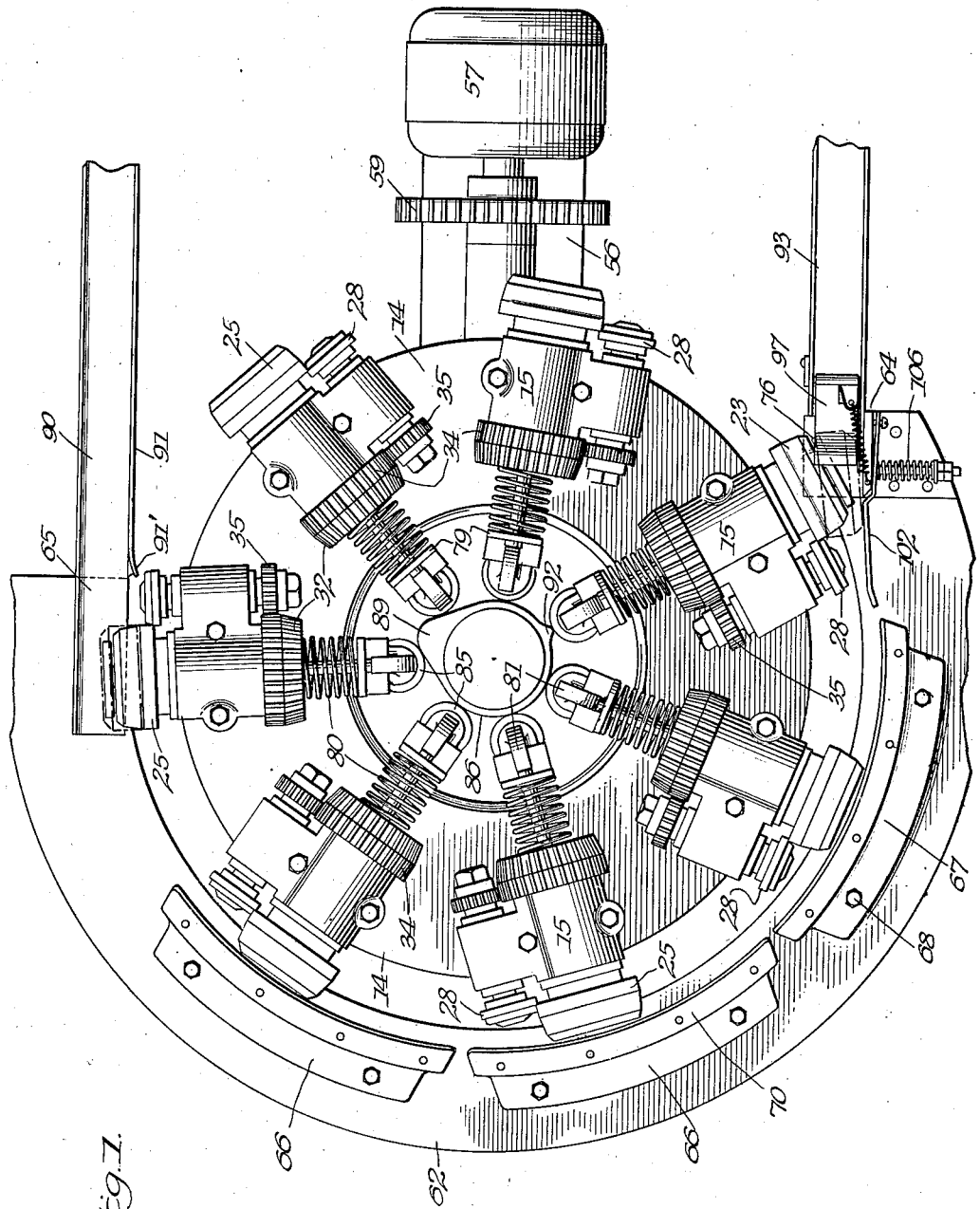
Figure 1 is a top plan view of the shell trimming machine.

The present shell trimming machine is designed to operate upon various shapes of sheet metal bodies, but is particularly adapted to trim the edges of shells which have been partially blanked preparatory to the process of making seamless containers from such shells by a drawing operation. This machine takes the shells after they have been drawn out to the form shown in Figure 5, and trims the roughened or uneven edges so that the shells when they are discharged from the machine will have uniform even edges similar to those shown in Figures 6 and 7. The shells after being discharged from the machine, are thereafter adapted to be operated on to bring them to their final shape or form.

The shell trimming machine comprises generally a base or pedestal 11 which rotatably supports a table 14 upon which are mounted a plurality of trimmer heads 23. These heads are positioned at spaced points on the table and project outwardly over the edge thereof. A shell feeding station 64 is located at one point adjacent the periphery of the table and is adapted to feed, as by gravity, the untrimmed shells into position to be automatically engaged and carried by the heads as they move with the table.

The trimmer heads are carried by spindles 16 which in turn are rotatably mounted in spindle housings 15 carried by the table. A small trimmer wheel 28 is also journaled in each spindle housing and cooperates with an associated trimmer head to produce a cutting or shearing action upon a shell after it has been received upon the head and during movement of the trimmer head with the rotating table. It will be understood that the heads and trimmer wheels revolve on a horizontal axis to trim the shells during the movement of the table about a vertical axis. At a point substantially diametrically opposite the feeding station, there is provided a discharge station 65 where the shells having trimmed edges are automatically ejected from the heads and discharged from the machine.

Each of the feed and discharge stations is supported upon opposite ends of a substantially semi-circular shell guide ring 62 which is positioned exteriorly of and spaced from the rotatable table in substantially concentric relation therewith. This guide ring supports a plurality of sectional spring pad walls 66 of curved contour so as to be substantially concentric with the table and guide ring, and which walls are adapted to resiliently maintain the shells in operative position on the trimmer heads at all times during the trimming operation.

Each trimmer head is provided with an ejector pad 76 which, during the trimming operation, is normally retained within a recess 77 formed in the head. As each head approaches the discharge station, means are provided to actuate its ejector pad and push it forwardly away from the head and thus gradually remove the trimmed shell from the head and deposit it in a suitable chute 90 at the discharge station. The ejector pads not only function to eject the shells from the heads but also assist in correctly positioning the untrimmed shells on the heads prior to the trimming operation.

Transmission means are provided for rotating the table and for revolving the trimmer heads and the small trimmer wheels at relatively high speeds. This means includes a ring gear 51 fixed to and rotatable with the table whereby the table is rotated, and a gear wheel 52 having a second ring gear operatively connected to gears on the trimmer head spindles, whereby the same are revolved, and a third ring gear rigidly connected to the second ring gear and spaced from the first ring gear and engaging the transmission means. A common pinion, operated from the prime mover, is positioned between and meshes with the first and third ring gears whereby these gears are rotated in opposite directions; that is, the first ring gear is rotated with the table while the second and third ring gears are rotated in the opposite direction to the table. In this manner, the trimmer head spindles are rotated at a relatively high speed, e. g., much greater than the speed of the table, and thus there is effected a rapid trimming operation during the movement of the heads from the feeding to the discharge stations.

Furthermore, a single shaft having a gear and operated from a suitable prime mover need only be employed, the gear engaging the first and third ring gears to impart the desired simultaneous rotation to the table and revolve the trimmer head spindles and the heads and wheels thereon.

*The body of the trimming machine (Figure 1)*

Referring to Figures 1 and 2 of the drawings, the invention will now be described in greater detail. The numeral 10 generally designates the present shell trimming machine having a supporting base 11 terminating in an upwardly extending pedestal 12 which rotatably supports a cylindrical element or sleeve 13 extending within the pedestal to the base and constituting a support for the rotatable table or spindle carrier 14. The table 14 projects outwardly above the pedestal 12, being rigidly connected to and forming a continuation of the upper portion of the cylindrical member 13.

*Trimmer head assembly (Figure 3)*

At spaced points on the top surface of the table, as shown in Figure 1, are mounted a plurality of spindle housings 15 within which are journaled hollow spindles 16 as shown in Figure 3. Each spindle is journaled in the housing by means of front and rear sets of thrust bearings 17 and 18 respectively. Front and rear cover plates 19 and 20 are secured to the housing and enclose and protect the bearings. As an additional protection, front and rear sealing rings 21 and 22 respectively are located in annular grooves in the plates 19 and 20 for retaining lubricant within the housing and preventing the introduction of dirt and grit.

The front end of each spindle 16 extends through the front of the housing and projects over the periphery of the table 14. Trimmer heads 23 are secured to the projecting portions of the spindles, each head being of substantially cylindrical formation having a slight forward taper which terminates in a beveled portion 24. The taper is to facilitate the automatic positioning of the untrimmed shells upon the heads and to prevent jamming of the shells while being placed on the heads. The beveled portions 24 are provided to conform to the shape of the closed ends of the shells as shown in Figures 5 to 7.

Each trimmer head comprises a front section 25, which may be formed of any desired metal, and a rear section 26 comprising a disc of hard metal and constituting a large trimmer wheel having a sharp rear cutting or shearing edge 27. This edge 27 cooperates with a small trimming wheel 28 to trim the uneven edges of the shells. The trimmer head sections 25 and 26 are secured to the spindle by suitable threaded screws 29 which pass through aligned openings in these sections and are threadedly connected in spaced openings 29' formed in an enlarged circular portion 30 of the spindle. The portion 30 is located in front of the forward cover plate 19 and is provided with an outwardly extending reduced projection 31 which passes through central openings in the sections 25 and 26. With this arrangement, the screws 29 securely clamp the sections 25 and 26 upon the front of the spindle.

The spindle 16 also projects through the rear portion of the housing 15 and at this point supports a gear wheel 32 splined or otherwise keyed to the spindle to rotate therewith. This gear is provided with a double set of teeth, each forming a ring gear. One set of teeth is beveled rearwardly and inwardly to form a beveled ring gear 33 meshing with suitable transmission means which will hereinafter be described and which rotates each spindle and head at a relatively high speed. The other set of teeth of gear wheel 32 form a forward ring gear 34 and the body of the gear on which teeth 34 are formed encloses the rear plate 20 and the rear end of the spindle housing as shown in Figure 3. This latter gear 34 meshes with a pinion 35 of considerably smaller diameter than the gear 34 and which is keyed to a second spindle 36 also journaled in the housing 15 parallel to the hollow spindle 16. A nut 37 engages the extreme threaded end portion of the spindle 16 to maintain the gear wheel 32 in operative position, while a similar nut 38 is threaded upon the spindle 36 to retain the pinion 35 thereon.

The spindle 36 is provided with a head 39 positioned exteriorly of the housing 15 and having a centrally disposed projection 40 over which the small trimmer wheel 28 is positioned. Suitable screws 41 are employed to securely mount the wheel 28 on the spindle 36. It will be observed that the wheel 28 is positioned directly in rear of the large trimmer wheel 26 and its adjacent edge 28' slightly overlaps the rear cutting edge 27 of the large trimmer wheel as shown in Figure 3. The front circular edge 28' of the wheel 28 is sharpened to provide a shearing surface cooperating with the sharpened edge portion 27 of the wheel 26 to produce a cutting or shearing action as these wheels are rotated in opposite directions by the gears 34 and 35. Furthermore, each trimmer head 23 is so designed with respect to the shells that when a shell 42 is correctly positioned thereon, the portion to be trimmed extends rearwardly of the cutting edge 27 as shown at 42' and between the cutting edges 27 and 28', and is thus severed by the shearing action of the wheels 26 and 28. Since each trimmer head during the rotation of the table 14 is constantly revolving, the trimming action will take place immediately a shell is positioned on the head. As has been stated, the trimmer head is revolved at a relatively high speed and in view of the differences in diameter of the gears 34 and 35, the small trimmer wheel 28 is rotated at a much higher speed than the large trimmer wheel 26 whereby a rapid and effective trimming operation is performed on each shell.

For the purpose of insuring that each shell 42 will be positively rotated after it has been placed on the head 23, a shell driving disc 43 is mounted on the spindle 36 in advance of the wheel 28. This disc is formed of any suitable metal and is provided with a plurality of spaced rearwardly extending driving pins 44, each of which projects into a hole 45 formed in the wheel 28 and which is slightly larger in diameter than the driving pins 44, as shown in Figure 3. The disc 43 is provided with a central aperture within which is positioned a rubber ring or bushing 46 surrounding the projection 40. In order to secure the driving disc 43 and the rubber bushing 46 in operative position in advance of the wheel 28, there is provided a washer 47 and a threaded element 48 passing through the washer and threadedly engaging an opening in the projection 40.

With this arrangement, the driving disc 43 is securely mounted on the spindle 36 but is permitted a slight radial sliding motion with respect to the spindle 36 and wheel 28 by reason of the rubber bushing 46 and the relative diameters of the driving pins 44 and the openings 45. Normally, the disc 43 is in engagement with the trimmer wheel 26, but when a shell is first positioned on the trimmer head, this driving disc 43 will be moved radially to accommodate the thickness of the wall of the shell and thereby permit the shell to be positioned on the head with the portion thereof to be trimmed extending rearwardly past the driving disc 43. At the same time, the driving disc 43 will be resiliently pressed upon the outer surface of the wall of the shell 42 sufficiently to produce a frictional driving engagement between the inner wall surface of the shell and the trimmer head 23 and thus insure that the shell is positively and continuously rotated with the trimmer head 23 immediately it is placed in operative trimming position.

*Transmission mechanism (Figure 2)*

Referring now to Figure 2, there is disclosed a transmission mechanism for actuating the table 14 and for rotating the trimmer head and for revolving the large and small trimmer wheels at a relatively high speed. The extreme upper edge portion of the pedestal 12 is provided with a raceway to receive suitable ball bearings 49 and a corresponding raceway is formed in a ring gear 50 secured to the cylindrical member 13, supporting the table 14, whereby the latter will be rotated with the gear. The cylindrical member 13 is formed with a shoulder 50' whereby the member 13 and table 14 are further supported on the ring gear 50, to be rotated therewith. The ring gear is provided with upwardly presented teeth 51, as shown. A second ring gear 52 also embraces the cylindrical member 13 directly below the table 14 and is independently rotatable with respect to this member 13 and about the same. The gear 52 is spaced from the gear 50 by a band 53 which may either be fixed to the member 13 or loosely mounted thereon between the gears and supports the ring gear 52. The upper gear 52 carries downwardly projecting teeth 54 positioned substantially in alignment with the teeth 51 of the ring gear 50. The ring gear 52 is formed with another set of teeth 55 which project upwardly directly below the table 14 and mesh with the beveled gears 33 carried by the spindles 16 of the trimming elements. As will be observed, each of the gears 33 projects downwardly into spaced openings formed in the table 14.

A suitable bracket 56 is carried on one side of the pedestal 12 and supports an electric motor or other prime mover 57. The motor shaft carries a pinion 58 meshing with a large gear 59 and constituting therewith a reduction gearing. The gear 59 is mounted on one end of a shaft 60 journaled in the bracket 56, while a beveled gear 61 is mounted on the other end of the shaft 60 and is positioned between and meshes continuously and simultaneously with the teeth 51 and 54. With the construction as thus described, it will be observed that upon operation of the motor 57, the pinion 61 will rotate the ring gear 50 and with it the cylindrical member 13 and the table 14. At the same time, the pinion 61 will rotate the ring gear 52 in a direction opposite to the ring gear 50 and also in a direction opposite to the direction of rotation of the table 14. The teeth 55 of ring gear 52 will be revolved in the same direction as the teeth 54; that is, in a direction opposite to the table 14, and therefore will necessarily rotate all of the beveled gears 32 and the trimmer heads 23 at a much greater speed than if the ring gear 52 was fixed on the base or pedestal 12. The present transmission mechanism thus has the function and advantage of rotating the trimmer head carrying table at the desired speed and at the same time of revolving the shell trimming wheels 27 and 28 at a relatively higher speed. It is noted that the table is rotated and the wheels revolved from a single drive shaft connected with a prime mover.

*Spring pad wall structure (Figures 1, 2 and 3)*

Referring to Figures 1 and 2, it will be observed that the table 14 is partially surrounded by a shell guide ring 62 which extends slightly more than half way around the table and is spaced outwardly therefrom. This ring is supported by suitable posts 63 carried by the base 11, and one extremity of the ring is located at the shell feeding station 64, while the other end of the ring terminates at the shell discharge station 65. The ring 62 supports an outer vertically extending wall made up of a plurality of segmental curved sections 66 which are positioned between the stations 64 and 65 and function to engage and retain the shells on their respective heads during the trimming operation. Each wall section 66 comprises a casting having a supporting flange 67 resting upon the ring 62 as shown in Figure 2. Each flange is formed with a pair of spaced slots 68 which receive bolts 69, whereby each section may be adjusted inwardly and outwardly with respect to the trimmer heads. The sections 66 are cut away longitudinally as shown at 69' and such cut away portions define with top plates 70 bolted to the top edge of each wall section 66, a continuous groove extending longitudinally of the section. At spaced points along each groove there are formed recesses 70' which receive coil springs 71. A spring pad 72 extends longitudinally of and is positioned in each groove as shown in Figures 2 and 3. Each pad comprises a base portion 73 of steel and a facing or covering 74 of hard bronze which is adapted to directly contact the closed ends of the shells as they rotate on the trimmer heads during the trimming operation, as shown in Figure 3. The extreme ends of the spring pads 72 are bent inwardly to form flanges 75 which engage the ends of the respective sections 66. The coil springs 71 normally urge the pads 72 outwardly as shown in Figure 3 so that they resiliently engage the shells 42 and cooperate to retain them in operative position upon the trimmer heads 23 and to prevent removal of the shells as they rotate on the heads during the trimming operation.

*Shell ejecting mechanism (Figures 1, 2 and 3)*

It is to be understood that the shells are trimmed as they pass over the distance comprehended by the sections 66 and as the shells approach the discharge station 65, they are gradually moved off of the trimmer heads and into a position to be automatically ejected therefrom when they reach the discharge station. The means for accomplishing this comprises ejector pads 76, as shown in Figure 3, carried by the trimmer heads and spindles 16. Each ejector pad is in the form of a disc and normally seats in a recess 77 formed in the front section 25 of each trimmer head. Each disc 76 is carried at the front end of a rod 78 which is slidably mounted in a central opening 78' in the spindle 16. The rear end of each ejector rod 78 carries a stop element 79 which projects outwardly from the spindle housing. A coil spring 80 embraces the rear end of the rod 78, having one end thereof engaging the stop 79, while the other end contacts the rear of the gear 32 and thus normally urges the rod rearwardly to maintain the pad 76 within its recess 77. The pad is maintained in this position throughout the entire trimming operation but is gradually moved outwardly as it approaches the discharge station 65.

The means for effecting this outward movement includes a plurality of ejector levers 81 mounted within and carried by the cylindrical table supporting member 13, as shown in Figure 2. Each lever 81 is pivoted at 82 to the base 83 of the supporting member 13 and extends upwardly therefrom. The extreme upper portion 84 of the lever projects above the table and is in direct alignment with the inner end of one of the ejector rods 78. In fact, the end portion 84 of each lever is curved outwardly and is in contact with the extreme inner end of the ejector rod 78 with which it is associated at all times, so that there will be no slack or lost motion between the rod, lever and a cam now to be described. Each lever, intermediate its ends, carries a cam roller 85 which is always pressed into engagement with a stationary ejector cam 86, by the spring pressed ejector rod 78. This cam is mounted on a central collar 87 of the base 11 and is rigidly connected thereto by suitable bolts 88.

The cam 86 (see Figures 1 and 2) is so designed that it maintains each ejector pad 76 within its recess during the trimming operation. However, as each trimmer head approaches the discharge station 65, the roller 85 moves upon the raised portion 89 of the cam. This has the effect of gradually pushing the rod 78 outwardly against the tension of the spring 80 and with it the ejector pad 76. The outward movement of the pad also moves the trimmed shell away from the trimmer head and at its maximum point of ejection, the trimmed shell will be clear of the head and positioned in the discharge chute 90. The inner wall 91 of the discharge chute constitutes a low rail which is inclined downwardly and outwardly at the shell receiving end, as shown at 91' in Figure 1. This inner wall 91, while being of sufficient height to retain and guide the trimmed shell in the chute, is however, low enough to permit the ejector pad and trimmer head to clear it when the shell is moved off the pad and as the table moves the pad and head away from the discharge station. Thus, the cam action will move each ejector pad out to a point where the shells will be clear of the trimmer head and moved into the chute 90; thereafter the roller 85 will have passed the maximum ejecting position and the spring 80 will then gradually return each pad into its recess 77. It is to be understood that during the operation of the machine, ejection and discharge of the trimmed shells will be continuous, with the shells finally rolling from the inclined outer end of the chute to a point where they are collected for the subsequent drawing operations.

*Shell feeding (Figures 1, 3 and 4)*

Referring to Figure 1, it will be observed that the cam 86, in addition to having the raised ejecting portion 89, is also provided with a less pronounced enlargement 92. This is designed to move the ejector pads 76 outwardly as they approach the shell feeding station 64, and is for facilitating the positioning or guiding of the shells on the trimmer heads 23 and to prevent any cocking action which might affect the trimming action of the trimmer wheels.

Referring to Figures 3 and 4, the feeding station 64 is supported at one end of the shell guide ring 62. The feeding means comprises a substantially channel shaped guide chute 93 down which the shells are fed by gravity. At the extreme lower end of the chute 93 there is positioned a horizontally disposed plate 94 having a transverse V-shaped groove 95 located directly in advance of the bottom of the chute. As clearly illustrated in Figure 4, the outer edge of the forward wall 96 of the groove terminates at a higher level than the outer edge of the rear wall of the groove. Thus, as each shell reaches the bottom of the chute, it will drop into the groove 95 and will be retained therein with its lowest portion at a point slightly below the upper extremity of the forward wall 96 of the groove. As a further means for retaining each shell in position to be received by one of the trimmer heads, there is provided a spring pressed retaining finger 97 which is pivotally mounted at 98 in the side walls of the chute 93. This finger is provided with an upstanding arm 99 to which is secured one end of a coil spring 100. The other end of the coil spring is connected to the upper end of a vertically extending flange 101 of the plate 94. Thus the spring 100 will constantly urge the finger 97 downwardly into contact with the lowermost shell in the chute 93 and cooperates with the transverse groove 95 to retain the shells properly in a position to be automatically picked up by the trimmer heads as they reach the feeding station, i. e. with their open ends exposed to the trimmer heads and in releasable engagement with the plate 94 and the spring pressed finger 97.

It will be observed that the section 66 of the shell retaining wall nearest the feeding station 64 (see Figures 1 and 3), terminates at a point in advance of the grooved plate 94. The space between these elements is closed by a positioning arm or guide 102, the free end 102' of which projects into close proximity to the adjacent edge 75 of the shell retaining wall. This positioning arm is loosely mounted on the exterior of the vertical flange 101 by means of suitable fastening elements 103 as shown in Figures 3 and 4 so that it may have a slight lateral swinging motion with respect to the flange 101. Washers 104 are inserted between the arm and the flange 101 to facilitate the swinging action of the arms. The positioning arm is, however, normally spring pressed into contact with the flange 101 and this is effected by providing a stud 105 carried by and projecting outwardly from the flange. This stud passes through an opening in the positioning arm and a coil spring 106 embraces the stud and normally presses the positioning arm against the flange. A pair of nuts 107 are threaded upon the end of the stud whereby the spring pressure exerted on the arm may be adjusted.

Referring to Figure 3 it will further be observed that the free end of the positioning arm is normally urged radially inwardly slightly in advance of the adjacent end of spring pad wall structure 72. Furthermore, the end of this pad and of the segment 66 adjacent the end of positioning arm 102 is set out slightly or offset beyond the remainder of the section, i. e., formed on a slightly greater radius than the radius of curvature of the remainder of the curved section 66 for the purpose of easing the shell, as it passes, into cutting position.

*Operation*

With the arrangement as above described, and assuming that a plurality of untrimmed shells are positioned in the feed chute 93, with the lowermost shell resting in the groove 95, as shown in Figure 4, this shell will be in position to be received by a trimmer head 23 as it approaches the feed station 64. As each trimmer head approaches this point, the raised portion 92 of the cam will effect an outward movement of its ejector pad 76 to the position shown in Figures 1 and 3. From these views, it will be observed that the trimmer head and the ejector pad partially enter the shell 42 while it is positioned in the groove 95 and immediately remove the shell from the groove as the head travels. Thereafter, the shell will gradually be positioned on the head. That is, the positioning arm 102 will be in direct contact with the closed end of the shell and will be urged slightly outward against the tension of the spring 105 by the trimmer head and shell until after the head passes to the first segment 66 and into engagement with the spring pad wall 72. At this point the shell is positioned on the head in proper trimming position. By reason of the ejector pad 76 being maintained in front of the head as the latter passes into the shell while the shell is held in the groove 95, and since the cam portion 92 gradually returns the pad to its normal position within the recess 77, the positioning of the shell on the head is greatly facilitated and any cocking action of the shell on the head, which might otherwise take place, is eliminated. Each shell 42 is thus entirely and correctly positioned on its trimmer head when the head has been rotated around to the first wall section 66. In view of the fact that the large and small trimmer wheels 26 and 28 are revolving at relatively high speeds during the rotation of the table, the trimming action will take place immediately upon proper positioning of the shell upon the head with the free edge of the shell disposed between the cutting edges 27 and 28', and this action will continue upon the revolving shell until the shell has been completely trimmed and is ejected from the head at the discharge station 65.

As has been stated, the inner edge of the shell guide ring 62 is concentrically spaced from the outer edge of the table 14 and forms therewith a substantially semiannular opening 108 over which the trimmer heads and the trimmer wheels 26 and 28 rotate. The principal purpose for providing this opening is to permit the trimmed portions of the shells to drop through to the base 11 of the machine during the trimming operation. Any suitable means (not shown) may be employed for collecting the scraps and for conveying them away from the machine.

It is to be understood that, while we have specifically shown the present machine as being adapted to operate upon partially formed containers, it is capable of being employed for many other trimming operations. Furthermore, such variations from the construction herein shown and described as are within the skill of a mechanic may, of course, be made without departing from the range of our invention.

We claim:
1. In a shell trimming machine, a movable table, a plurality of rotatable shell receiving heads carried by said table, each head having a sharp circular shearing edge over which a por- tion of the shell to be trimmed is adapted to extend, means carried by said table and including a plurality of trimming wheels, each positioned adjacent a head and cooperating with its circular shearing edge to produce a cutting action when the head and trimming wheel are rotated during the movement of the heads and trimming wheels with the table, and means carried by each head for ejecting a shell therefrom after the trimming operation.

2. In a shell trimming machine, a movable table, a plurality of rotatable shell receiving heads carried by said table, each head having a sharp circular shearing edge over which a portion of the shell to be trimmed is adapted to extend, means carried by said table and including a plurality of trimming wheels, each positioned adjacent a head and cooperating with its circular edge to produce a cutting action when the head and trimming wheel are rotated during the movement of the heads and trimming wheels with the table, shell ejecting elements carried by said heads, and a common means for actuating said ejecting elements to eject the shells from the heads after each trimming operation.

3. In a shell trimming machine, a movable table, a plurality of shell receiving heads carried by said table, means carried by said table and associated with said heads for trimming the shells as they move with the table, shell ejecting elements carried by said heads, and means for actuating said ejecting elements to eject the shells from the heads after each trimming operation, said last mentioned means including cam operated levers carried by said machine and movable into and out of operative engagement with said ejecting elements.

4. In a shell trimming machine, a rotatable table having a central opening, a plurality of shell receiving heads mounted at spaced points on the table and facing outwardly, means associated and movable with the heads for trimming the shells during their rotation with the table, shell ejecting elements carried by said heads, and means for actuating said ejecting elements to eject shells from the heads after each trimming operation, said last mentioned means including a plurality of levers pivotally connected to the table and positioned within the central opening thereof, and a stationary cam carried by said machine in the path of said levers and operable to move said levers into and out of operative engagement with said ejecting elements.

5. In a shell trimming machine, a rotatable table having a central opening, a plurality of shell receiving heads mounted at spaced points on the table and facing outwardly, means associated and movable with the heads for trimming the shells during their rotation with the table, shell ejecting elements carried by said heads, each including a rod normally projecting inwardly over the central opening in the table, and means for actuating said ejecting elements to eject shells from the heads after each trimming operation, said last mentioned means including a plurality of levers pivotally connected to the table within the central opening, each lever having its free end in alignment with one of said ejector rods and adapted to push the rod outwardly whereby to eject a shell from its respective head, and a stationary cam carried by said machine in the path of said levers and operable to move said levers into and out of operative engagement with said ejector rods.

6. In a shell trimming machine, a rotatable table, a plurality of shell receiving heads mounted at spaced points on the table and facing outwardly, means for feeding shells to the heads, means associated and movable with the heads for trimming the shells during their rotation with the table, and means positioned exteriorly of the heads and adapted to engage the shells and retain them on their respective heads during the trimming operation.

7. In a shell trimming machine, a rotatable horizontally positioned table, a plurality of shell receiving heads mounted at spaced points on the table and facing outwardly, means for feeding shells to the heads, means associated and movable with the heads for trimming the shells during their rotation with the table, and a stationary wall positioned exteriorly of but in close proximity to the heads and adapted to engage the shells and retain them on their respective heads during the trimming operation.

8. In a shell trimming machine, a rotatable horizontally positioned table, a plurality of shell receiving heads mounted at spaced points on the table and facing outwardly, means for feeding shells to the heads, means associated and movable with the heads for trimming the shells during their rotation with the table, a stationary guide positioned exteriorly of but in close proximity to the trimmer heads, and a resiliently mounted wall carried by said guide and adapted to contact the shells and retain them on their respective heads during the trimming operation.

9. In a shell trimming machine, a rotatable table, a plurality of shell receiving heads rotatably mounted at spaced points on the table and facing outwardly, means for feeding shells to the heads, means associated and movable with the heads for trimming the shells during their rotation with the table, means for retaining the shells on the heads during the trimming operation, a discharge chute positioned tangentially to the outer edge of the table, and shell ejecting means carried by the heads for transferring the shells to the chute after the trimming operation.

10. In a shell trimming machine, a rotatable table, a plurality of shell receiving heads mounted at spaced points on the table and facing outwardly, means for feeding shells to the heads, means for retaining the shells on the heads during the trimming operation, a discharge chute positioned tangentially to the outer edge of the table, shell ejecting pads carried by and normally maintained in engagement with said heads, and means operable as the heads approach the discharge chute to move the pads away from the heads and transfer the shells from the heads to the discharge chute.

11. In a shell trimming machine, a rotatable table, a plurality of shell receiving heads mounted at spaced points on the table and facing outwardly, means for feeding shells to the heads, means for retaining the shells on the heads during the trimming operation, a discharge chute positioned tangentially to the outer edge of the table, shell ejecting pads carried by and normally maintained in spring-pressed engagement with the outer faces of said heads, and cam operated means for gradually moving the pads away from the heads as they approach the discharge chute to thereby eject the shells from the heads and transfer them to the discharge chute.

12. In a shell trimming machine, a rotatable table, a plurality of shell receiving heads mounted at spaced points on the table and facing outwardly, means for feeding and retaining shells in position to be received on and carried by the heads as they rotate with the table, means for maintaining the shells on the heads during the trimming operation, shell ejecting members carried by and normally maintained in engagement with said heads, and means for moving said members away from the heads to eject the shells therefrom after the trimming operation, said last mentioned means maintaining said members in spaced relation to the heads as they approach the shell feeding means to permit said members to initially engage the shells and assist in positioning them on the heads for the trimming operation.

13. In a shell trimming machine, a rotatable table, a plurality of shell receiving heads mounted at spaced points on the table and facing outwardly, means for feeding and retaining shells in position to be received on and carried by the heads as they rotate with the table, means for maintaining the shells on the heads during the trimming operation, shell ejecting pads carried by and normally maintained in engagement with said heads, and means for moving said pads away from the heads to eject the shells therefrom after the trimming operation, said last mentioned means maintaining the pads in extended position as they approach the feeding means to permit the pads to initially engage the shells, said last mentioned means thereafter gradually retracting the pads into engagement with their heads to assist in positioning the shells on the heads for the trimming operation.

14. A shell supporting member for use with a shell trimming machine, comprising a spindle housing, a spindle journaled in said housing, means for rotating said spindle, trimming means associated with said spindle, a shell receiving head carried by said spindle, and a shell ejecting pad carried by said head and movable outwardly therefrom to eject a shell from the head.

15. A shell supporting member for use with a shell trimming machine, comprising a spindle housing, a hollow spindle journaled in said housing, means for rotating said spindle, trimming means associated with said spindle, a shell receiving head mounted on one end of the spindle, a shaft mounted in and axially movable relative to said hollow spindle, a shell ejecting pad carried by said shaft and normally maintained in contact with said head but capable of movement away from the head to eject a shell.

16. A shell supporting member for use with a shell trimming machine, comprising a spindle housing, a hollow spindle journaled in said housing, means for rotating said spindle, trimming means associated with said spindle, a shell receiving head mounted on one end of the spindle, a shaft mounted in and axially movable relative to said hollow spindle, a shell ejecting pad mounted on one end of the shaft and positioned in front of the head, a stop carried by the other end of the shaft, and a coil spring mounted on the shaft between the stop and spindle and normally maintaining the ejector pad in contact with the head.

17. A shell supporting member for use with a shell trimming machine, comprising a spindle housing, a spindle journaled in said housing, means for rotating said spindle, trimming means associated with said spindle, a shell receiving head mounted on one end of said spindle and provided with an outwardly opening recess, and a shell ejecting pad carried by said head and normally retained within said recess, said pad being movable out of said recess away from said head to eject a shell from the head.

18. In a shell trimming machine, a rotatable shell receiving head having a sharp circular shearing edge over which a portion of the shell to be trimmed is adapted to extend, and means positioned adjacent said head and cooperating with said circular shearing edge to produce a cutting action when the head is rotated, said means being fixed in trimming position relative to said head whereby a shell may be applied to said head without adjustment of said means relative to said head.

19. In a shell trimming machine, a rotatable shell receiving head having a sharp circular shearing edge over which a portion of the shell to be trimmed is adapted to extend, and a trimming wheel rotatable oppositely to and of smaller diameter than said head, said trimming wheel being positioned adjacent said head and cooperating with said circular shearing edge to produce a cutting action when said head and trimming wheel are rotated, said trimming wheel being fixed in trimming position relative to said head whereby a shell may be applied to said head without adjustment of said trimming wheel relative to said head.

20. In a shell trimming machine, a rotatable shell receiving head having a sharp circular shearing edge over which a portion of the shell to be trimmed is adapted to extend, and a trimming wheel rotatable oppositely to said head, said trimming wheel being located in rear of and in overlapping relation to said head to produce a cutting action therewith when the head and trimming wheel are rotated, and a shell driving element carried by said trimming wheel and adapted to engage a shell and prevent slipping thereof on the head during the trimming operation.

21. In a shell trimming machine, a rotatable shell receiving head having a sharp circular shearing edge over which a portion of the shell to be trimmed is adapted to extend, and a trimming wheel rotatable oppositely to said head, said trimming wheel being located in rear of and in overlapping relation to said head to produce a cutting action therewith when the head and trimming wheel are rotated, and a shell driving disk resiliently mounted on the trimming wheel within the plane of the head and adapted to engage a shell and prevent slipping thereof on the head during the trimming operation.

22. In a shell trimming machine, a spindle housing, a spindle journaled in said housing, a shell receiving head carried by said spindle, a trimming wheel positioned in rear of and connected to said head and having a sharp circular shearing edge over which a portion of the shell to be trimmed is adapted to extend, a second spindle journaled in said housing, and a second trimming wheel carried thereby and positioned in operative relation to said first trimming wheel whereby said wheels will effect a cutting action on a shell when said spindles are rotated, said trimming wheels being fixed against relative lateral movement and permitting application of a shell to said head during rotation of said wheels.

23. In a shell trimming machine, a spindle housing, a spindle journaled in said housing, a shell receiving head carried by said spindle, a trimming wheel positioned in rear of and connected to said head, and having a sharp circular shearing edge over which a portion of the shell to be trimmed is adapted to extend, a second spindle journaled in said housing, a second trimming wheel carried thereby and positioned in operative relation to said first trimming wheel whereby said wheels will effect a cutting action on a shell when said spindles are rotated, and means for rotating said trimming wheels in opposite directions and at different rates of speed to effect a trimming operation on a shell positioned on said head, said trimming wheels being fixed against relative lateral movement and permitting application of a shell to said head during rotation of said wheels.

24. In a shell trimming machine, a spindle housing, a spindle journaled in said housing, a shell receiving head mounted at one end of said spindle, a large trimming wheel mounted on said spindle in rear of head and connected to said head and having a sharp circular shearing edge over which a portion of the shell to be trimmed is adapted to extend, a second spindle journaled in said housing, a small trimming wheel mounted on said second spindle in overlapping relation to said large trimming wheel, and means to rotate said trimming wheels in opposite directions and at different speeds whereby said wheels will effect a cutting action on a shell positioned on said head, said trimming wheels being fixed against relative lateral movement and permitting application of a shell to said head during rotation of said wheels.

25. In a shell trimming machine, a spindle housing, a spindle journaled in said housing, a shell receiving head mounted at one end of said spindle, a large trimming wheel mounted on said spindle in rear of and connected to said head and having a sharp circular shearing edge over which a portion of the shell to be trimmed is adapted to extend, a second spindle journaled in said housing, a small trimming wheel mounted on said second spindle in overlapping relation to said large trimming wheel, and means to rotate said trimming wheels in opposite directions and at different speeds whereby said wheels will effect a cutting action on a shell positioned on said head, said means including a large gear mounted on said first mentioned spindle, and a small gear mounted on said second mentioned spindle and meshing with said first gear, said trimming wheels being fixed against relative lateral movement and permitting application of a shell to said head during rotation of said wheels.

26. In a shell trimming machine, a base, a table rotatably mounted on said base, a plurality of trimming heads rotatably mounted on said table and adapted to support and rotate shells during travel of said heads with the table, and transmission means for rotating said table and heads, said means comprising a ring gear movable with said table, a second ring gear movable relative to said table and operatively connected to said trimmer heads, and means for operating said ring gears.

27. In a shell trimming machine, a base, a table rotatably mounted on said base, a plurality of trimmer heads rotatably mounted on said table and adapted to support and rotate shells during travel of said heads with the table, and transmission means for rotating said table and heads, said means comprising a ring gear fixed to said table and rotatable therewith, a second ring gear operatively connected to said trimmer heads and rotatable reversely to said first ring gear, and means for operating said ring gears.

28. In a shell trimming machine, a base, a table rotatably mounted on said base, a plurality of trimmer heads rotatably mounted on said table and adapted to support and rotate shells during travel of said heads with the table, and transmission means for rotating said table and heads, said means comprising a ring gear fixed to said table and rotatable therewith, a second ring gear operatively connected to said trimmer heads, and carried by but rotatable reversely to said table and first ring gear, and a common operating means for rotating said ring gears.

29. In a shell trimming machine, a base, a table rotatably mounted on said base, a plurality of spindles journaled at spaced points on said table, a trimmer head mounted on one end of each spindle, a gear wheel mounted on the other end of each spindle, said trimmer heads being adapted to support and rotate shells during travel of said heads with the table, and transmission means for rotating said table and head, said means comprising a ring gear fixed to said table and rotatable therewith, a second ring gear supported on said table above said first ring gear and meshing with the gear wheels on said trimmer head spindles, and a pinion positioned between and meshing with said ring gears whereby rotation of said pinion will rotate said ring gears in opposite directions.

30. In a shell trimming machine, a rotatable table, a plurality of shell receiving heads mounted at spaced points on said table and facing outwardly, means associated with said heads for trimming the shells as they are carried on said heads, and means for feeding shells into position to be received on said heads during rotation of said table, said means including a gravity feed chute, a plate positioned in advance of said chute and provided with a groove adapted to receive the lower portion of a shell, and a spring pressed finger mounted on said chute and adapted to engage the top of a shell and cooperate with the groove to releasably maintain a shell in head receiving position.

31. In a shell trimming machine, a rotatable table, a plurality of shell receiving heads mounted at spaced points on said table and facing outwardly, means associated with said heads for trimming the shells as they are carried on said heads, a guide positioned exteriorly of but in close proximity to the trimmer heads, and adapted to contact the shells and retain them on their respective heads during the trimming operation, a shell feeding station including means for releasably maintaining shells in position to be received by the heads as the table rotates, and a positioning arm resiliently carried by the feeding station and normally urged into the path of the heads and cooperating therewith to correctly position a shell on the head, said positioning arm having its free end terminating in close proximity to one end of the guide.

32. In a shell trimming machine, a rotatable table, a plurality of shell receiving heads mounted at spaced points on said table and facing outwardly over the edge of the table, means associated with said heads for trimming the shells as they are carried on said heads, and a guide positioned exteriorly of said table and adapted to engage the shells and retain them on their respective heads during the trimming operation, said guide forming with the table an arcuate opening to permit the trimmed scraps to be discharged from the machine.

33. In a shell trimming machine, a table rotatable about a vertical axis and having a central opening, a plurality of shell receiving heads mounted at spaced points on the table and facing outwardly, means associated and movable with the heads for trimming the shells during their rotation with the table, shell ejecting elements carried by said heads, and means located within the table opening for actuating said shell ejecting elements.

34. In a shell trimming machine, a rotatable shell receiving head having a sharp circular shearing edge over which a portion of the shell to be trimmed is adapted to extend, and a trimming wheel rotatable oppositely to said head, said trimming wheel being located in rear of and in overlapping relation to said head to produce a cutting action therewith when the head and trimming wheel are rotated, a shell driving element carried by said trimming wheel and adapted to engage a shell and prevent slipping thereof on the head during the trimming operation, and means for mounting said driving element on said trimming wheel to permit a slight movement of said element relative to said wheel to facilitate placing of a shell on said head.

35. In a shell trimming machine, a rotatable shell receiving head having a sharp circular shearing edge over which a portion of the shell to be trimmed is adapted to extend, and a trimming wheel rotatable oppositely to said head, said trimming wheel being located in rear of and in overlapping relation to said head to produce a cutting action therewith when the head and trimming wheel are rotated, and a shell driving disk coaxially mounted on and capable of a slight lateral movement relative to said trimming wheel and adapted to engage a shell and prevent slipping thereof on the head during the trimming operation.

36. In a shell trimming machine, a rotatable shell receiving head having a sharp circular shearing edge over which a portion of the shell to be trimmed is adapted to extend, and a trimming wheel rotatable oppositely to said head, said trimming wheel being located in rear of and in overlapping relation to said head to produce a cutting action therewith when the head and trimming wheel are rotated, a shell driving disk having a central opening, a resilient washer positioned in said opening, and means for mounting said disk and washer coaxially on said trimming wheel to permit a slight lateral movement of said disk relative to said wheel.

37. In a shell trimming machine, a rotatable support, a plurality of rotatable shell receiving heads carried by said support, each head having a sharp circular shearing edge over which a portion of the shell to be trimmed is adapted to extend, means carried by said support and including a plurality of trimming wheels, each positioned adjacent a head and cooperating with its circular shearing edge to produce a cutting action when the head and trimming wheel are rotated during movement of the heads and trimming wheels with the support, and means for removing the trimmed shells from the heads.

AMOS CALLESON.
EDGAR A. CALLESON.